(12) United States Patent
Risen, Jr. et al.

(10) Patent No.: US 6,602,336 B2
(45) Date of Patent: *Aug. 5, 2003

(54) PRINTING MEDIUM COMPRISING AEROGEL MATERIALS

(75) Inventors: William M. Risen, Jr., Rumford, RI (US); Shuang Ji, Providence, RI (US); Xiangjun Hu, Providence, RI (US); Ruiyun Zhang, Ann Arbor, MI (US)

(73) Assignee: Brown University Research Foundation, Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/928,961

(22) Filed: Aug. 13, 2001

(65) Prior Publication Data

US 2002/0016397 A1 Feb. 7, 2002

Related U.S. Application Data

(63) Continuation of application No. 09/130,943, filed on Aug. 7, 1998, now Pat. No. 6,303,046
(60) Provisional application No. 60/085,469, filed on May 14, 1998, and provisional application No. 60/055,146, filed on Aug. 8, 1997.

(51) Int. Cl.⁷ .............. C08J 3/11; C08L 5/08; C09D 105/08; C09K 3/00
(52) U.S. Cl. .......... 106/31.94; 252/1; 252/408.1; 252/587; 106/162.2; 501/12; 502/159; 428/404
(58) Field of Search .............. 516/100, 101, 516/105; 501/12; 106/162.2, 31.94, 491; 428/305.5, 307.3, 404; 252/1, 408.1, 587; 502/159; 536/20

(56) References Cited

U.S. PATENT DOCUMENTS

| | | | |
|---|---|---|---|
| 3,455,717 A | * 7/1969 | Debus | 106/491 X |
| 4,274,980 A | 6/1981 | Arena | 502/159 |
| 4,432,956 A | 2/1984 | Zarzycki et al. | 501/12 X |
| 4,440,827 A | 4/1984 | Miyamoto et al. | 428/327 |
| 4,584,280 A | 4/1986 | Nanao et al. | 501/12 X |
| 4,954,327 A | 9/1990 | Blount | 501/12 X |
| 5,009,688 A | 4/1991 | Nakanishi | 501/12 X |
| 5,292,801 A | 3/1994 | Avnir et al. | 501/12 X |
| 5,318,846 A | 6/1994 | Bruening et al. | 428/404 X |
| 5,348,799 A | * 9/1994 | Boston | 536/20 X |
| 5,395,805 A | 3/1995 | Droege et al. | 501/12 |
| 5,565,142 A | 10/1996 | Deshpande et al. | 516/100 X |
| 5,587,467 A | * 12/1996 | Murakami et al. | 502/405 X |
| 5,624,875 A | 4/1997 | Nakanishi et al. | 501/12 X |
| 5,853,886 A | 12/1998 | Pinnavaia et al. | 428/404 X |
| 5,948,314 A | 9/1999 | Geiss et al. | 516/100 X |
| 5,958,115 A | 9/1999 | Böttcher et al. | 501/12 X |
| 6,129,785 A | * 10/2000 | Schliesman et al. | 106/491 X |
| 6,156,492 A | * 12/2000 | Kobayashi et al. | 536/20 X |
| 6,303,046 B1 | * 10/2001 | Risen, Jr. et al. | 252/1 |

FOREIGN PATENT DOCUMENTS

| | | | |
|---|---|---|---|
| GB | 2142616 | 1/1985 | 252/408.1 |
| JP | 401176234 | 7/1989 | 501/12 |

OTHER PUBLICATIONS

M. Cantin, et al., "Silica Aerogels Used as Cherenkov Radiators," *Clear Instruments and Methods*, 118 pp. 177–182 (1974).

J. Yan, et al., "The Preparation and Characterization of Silica Gels Doped with Copper Complexes," *Journal of NonCrystalline Solids*, 180, pp. 180–190 (1995).

Husing, et al., "Aerogels—Airy Materials: Chemistry, Structure, and Properties," *Agnew Chem. Int. Ed.*, 1998, 37, pp. 23–45.

Novak, et al., "Low–Density, Mutually Interpenetrating Organic–Inorganic Composite Materials via Supercritical Drying Techniques," *Chem. Mater.*, vol. 6, No. 3, 1994, 6 pages.

V.D. Mattera, Jr., et al., "Chemistry of Metals in Ionomers: Reactions of Rhodium–PSSA with $Co_1$, $H_2$ and $H_2O$," *Inorganic Chemistry*, vol. 23, No. 22, pp. 3597–3601 (1984).

I Wun Shim, et al., "The Chemistry of Ruthenium in PSSA Ionomer: Reaction of Ru–PSSA with $Co_1$, $H_2$, $O_2$, and Alcohols," *Journal of Catalysis*, 94, pp. 531–542 (1985).

Siyu Ye, et al., "A New Electrocatalyst Consisting of a Molecularly Homogeneous Platinum–Aerogel Nanocomposite," *Can J. Chem*, 75, pp. 1666–1673 (1997).

L.M. Hair, et al., Local, Nano– and Micro–Structures of Mixed Metal Oxide Aerogels for Catalyst Applications, *Journal of Non–Crystalline Solids*, 186, pp. 168–176 (1995).

V.D. Mattera, Jr., et al., "A Kinetic Study of the Catalytic Oxidation of CO over Nafion–Supported Rhodium, Ruthenium, and Platinum," *The Journal of Physical Chemistry*, vol. 90, No. 20, pp. 4819–4824 (1986).

R.C. Mehrotra, "Present Status and Future Potential of the Sol–Gel Process," *Chemistry, Spectroscopy and Applications of Sol–Gel Glasses*, pp. 1–37 (1992).

*Aerogels*, Edited by Jochen Fricke, Proceedings in Physics 6, 1986, Table of Contents, pp. vii and viii.

C. Jeffrey Brinker, et al., "The Physics and Chemistry of Sol–Gel Processing," *Sol–Gel Science*, Table of Contents (2 pages) (May 1990).

*Sol–Gel Technology for Thin Films, Fibers, Preforms, Electronics, and Specialty Shapes*, Edited by Lisa Klein, 1988, Table of Contents, pp. xiii–xxi.

S.S. Kistler, "Coherent Expanded Aerogels and Jellies," *Nature*, No. 3211, vol. 127, p. 741, U2, May 16, 1931.

* cited by examiner

Primary Examiner—Richard D. Lovering
(74) Attorney, Agent, or Firm—Fay, Sharpe, Fagan, Minnich & McKee, LLP

(57) ABSTRACT

New aerogels are disclosed which comprise silica, at least one organic polymer having polar functional groups, and at least one metal ion. Also disclosed are methods for making such aerogels. The present invention further concerns printable objects comprising these aerogels, specifically when the print media are imaged by the absorption of liquid and the spatial localization of pigments or dyes.

11 Claims, 8 Drawing Sheets

PRINTING MEDIUM COMPRISING AEROGEL MATERIALS

CROSS REFERENCES TO RELATED APPLICATION

The present application is a continuation of U.S. application Ser. No. 09/130,943, filed on Aug. 7, 1998 (now U.S. Pat. No. 6,303,046), which claims priority to U.S. Provisional Application Serial No. 60/085,469, filed May 14, 1998 and U.S. Provisional Application Serial No. 60/055,146, filed Aug. 8, 1997.

FIELD OF THE INVENTION

The present invention relates to printing medium and materials based on aerogels that comprise silica, a particular class of polymers, and at least one metal ion. The invention also relates to various methods for producing the aerogels of this invention. In addition, the present invention pertains to numerous applications and devices utilizing the new aerogels.

BACKGROUND OF THE INVENTION

An aerogel is a gel which has a lower density than the fully condensed form of the material comprising the gel. Aerogels typically are produced by replacing the liquid of a gel by air or another gas without allowing complete collapse of the structure. The seminal report on this was made by Kistler in 1931 (Nature, 127, 741(1931)), who described the goal of the research as being "to test the hypothesis that the liquid in a jelly can be replaced by a gas with little or no shrinkage". This early work led to aerogels through the use of supercritical fluids to extract liquid, and it led to the hypothesis that the gel structure itself can be preserved in the supercritical drying process, as disclosed by Marshall in U.S. Pat. No. 285,449 (1942).

There have been many successes in the aerogel field, as disclosed in the scientific and technical literature and in patents. Of relevance to the current invention is the area known in some contexts as Organically Modified Ceramics, referred to as ORMOCERS or called CERAMERS, which have been widely studied. A descriptive review of this area is that of R. C. Mehrotra (Present Status and Future Potential of the Sol-Gel Process, Chapter 1 in Chemistry, *Spectroscopy and Applications of Sol-Gel Glasses, Structure and Bonding Series* 77, Eds. R Reisfeld and C. K. Jorgensen, Springer-Verlag, Berlin, 1992). This reference points to the distinction between composite materials that are mixed at the molecular level and those that have mechanically combined components. This reference also discusses work directed to organically modified gels in the form of aerogels and their subsequently dried, fused, oxidized and otherwise treated forms. Also of relevance are works concerning aerogels and their applications. The book *Aerogels* edited by J. Fricke (Springer Proceeding in Physics 6, Springer-Verlag, Berlin, 1985), the book *Sol-Gel Science, The Physics and Chemistry of Sol-Gel Processing* by C. J. Brinker and G. W. Scherer (Academic Press, Inc. Harcourt Brace Jovanovich, Publ., New York, 1990) and the book *Sol-Gel Technology for Thin Films, Fibers, Preforms, Electronics and Specialty Shapes,* Ed. L. C. Klein (Noyes, Park Ridge, N.J., 1988) are of relevance and show the great importance attached to the formation of aerogels with specific properties and functions. U.S. Pat. No. 4,440,827 discloses in claim 13 the use of silica particles in media for ink jet recording and optical bar code printing, wherein one of the methods for preparing the synthetic silica that may be used is an aerogel process. The use of silica aerogel in Cerenkov detectors is described, for example, by M. Cantin, L. Koch, R. Jouan, P. Mestreau, A. Roussel, F. Bonnin, J. Moutel and S. J. Tiechner, in their paper in Nuclear Instruments and Methods, 118, 177 (1974).

Examples of aerogels which contain or have added to them, metal ions or metal containing species are well known. Those known fall into several categories, including: (1) a silica aerogel that has been dipped into a solution or dispersion containing the metal ion source; (2) a polymer matrix aerogel, such as a polyacrylonitrile aerogel, that contains metal ions added to the aerogel or to the gel before formation of the aerogel (e.g. L. M. Hair, L. Owens, T. Tillotson, M. Froba, J. Wong, G, J. Thomas, and D. L. Medlin, J. Non-Crystalline Solids, 186, 168 (1995), and S. Ye, A. K. Vijh, Z-Y Wang, and L. H. Dao, Can. J. Chem. 75, 1666 (1997)); or (3) a silica aerogel having metal ions (e.g.. M. A. Cauqui, J. J. Calvino, G. Cifredo, L. Esquivias, and J. M. Rodriguez-Izquierdo, J. Non-Crystalline Solids, 147&148, 758 (1992)) or small metal compounds bound in it (e.g.. Y. Yan, A. M. Buckley and M. Greenblatt, J. Non-Crystalline Solids, 180, 180 (1995)).

The use of supported metal and metal ions for catalysis is widely known and practiced, and many reports exist in the scientific, technical, engineering, and patent literature. Relevant studies include "The Chemistry of Ruthenium in PSSA Ionomer: Reactions of Ru-PSSA with CO, $H_2$ and $O_2$ and Alcohols" (I. W. Shim, V. D. Mattera, Jr., and W. M. Risen, Jr., Journal of Catalysis, 94, 531 (1985), which includes a report of a static Fischer-Tropsch reaction catalysis by supported ruthenium under mild conditions of 150° C. and 600 Torr total pressure, "A Kinetic Study of the Catalytic Oxidation of CO over Nafion-Supported Rhodium, Ruthenium, and Platinum", by V. D. Mattera, Jr., D. M. Barnes, S. N. Chaudhuri, W. M. Risen, Jr., and R. D. Gonzalez, Journal of Physical Chemistry, 90, 4819 (1986), which shows this catalysis, and "Chemistry of Metals in Ionomers: Reactions of Rhodium-PSSA with CO, $H_2$, and $H_2O$", Inorganic Chemistry, 23, 3597 (1984), which shows relationships between spectroscopic observations on supports that have been exposed to these gases and the compounds formed and the oxidation states of rhodium species.

Despite the known aerogels and metal supports, a need still remains for improved aerogels and related materials having superior properties and applicability.

SUMMARY OF THE INVENTION

In a first aspect, the present invention provides a new and unique printing medium that comprises an aerogel which includes silica, at least one polymer having a polar functional group, and at least one metal-ion-containing species.

In yet another aspect, the present invention provides a medium for printing that comprises an aerogel comprising silica and an organic polymer.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DESCRIPTION OF THE PREFERRED EMBODIMENTS

Figure 1A:
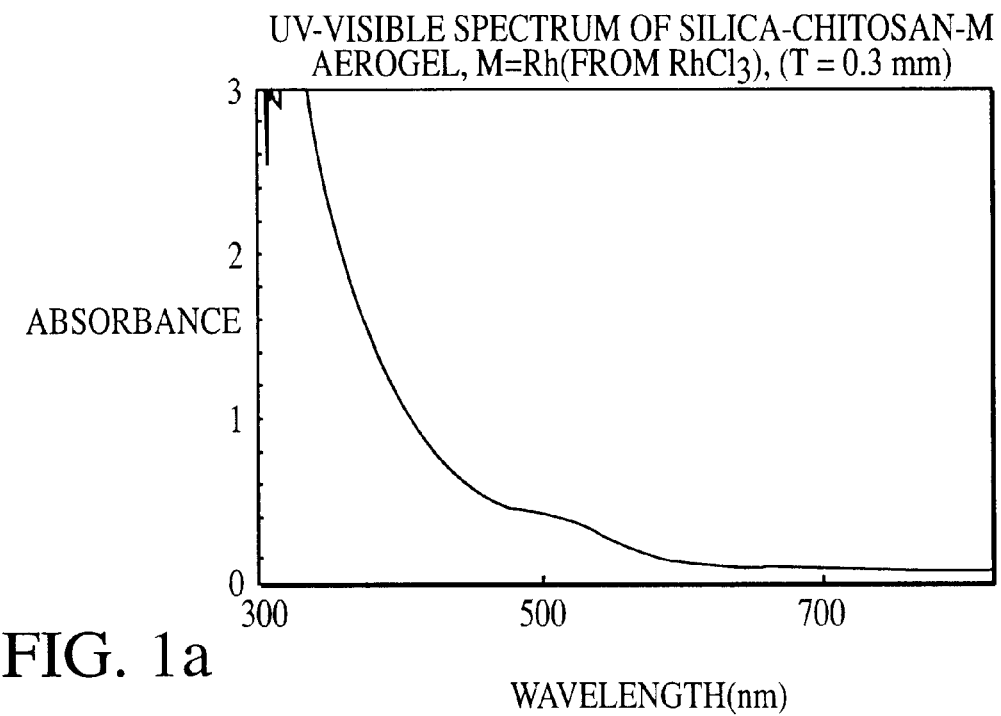
FIGS. 1*a* to 1*f* illustrate the ultraviolet-visible range spectrum of various silica-chitosan-M aerogels in accordance with a preferred aspect of the present invention.
Figure 1B:
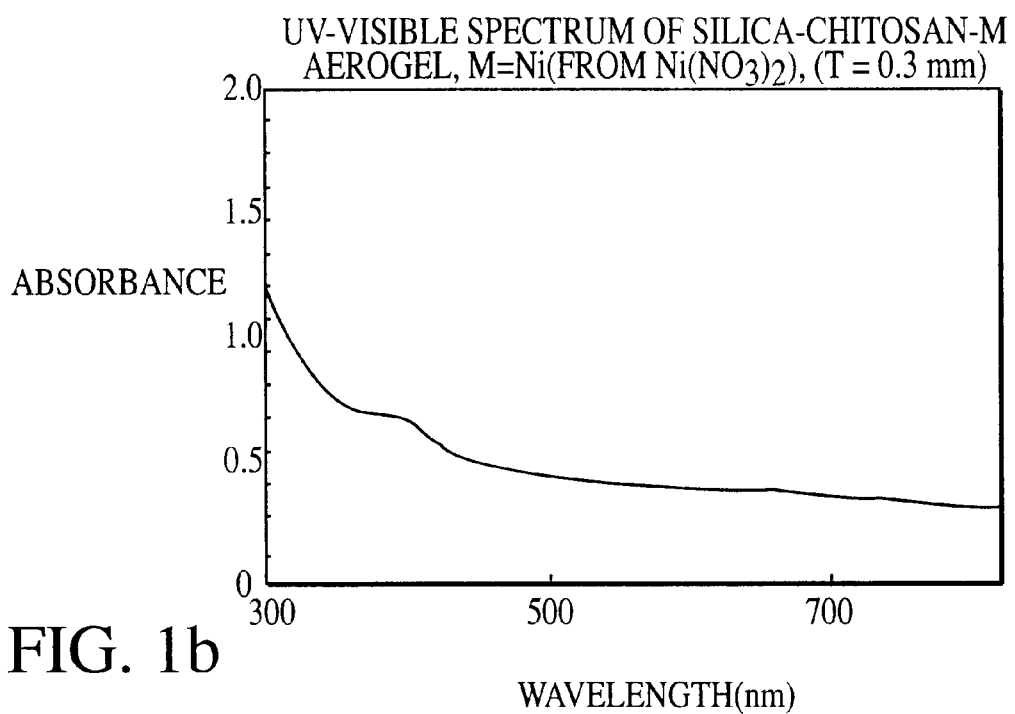
Figure 1C:
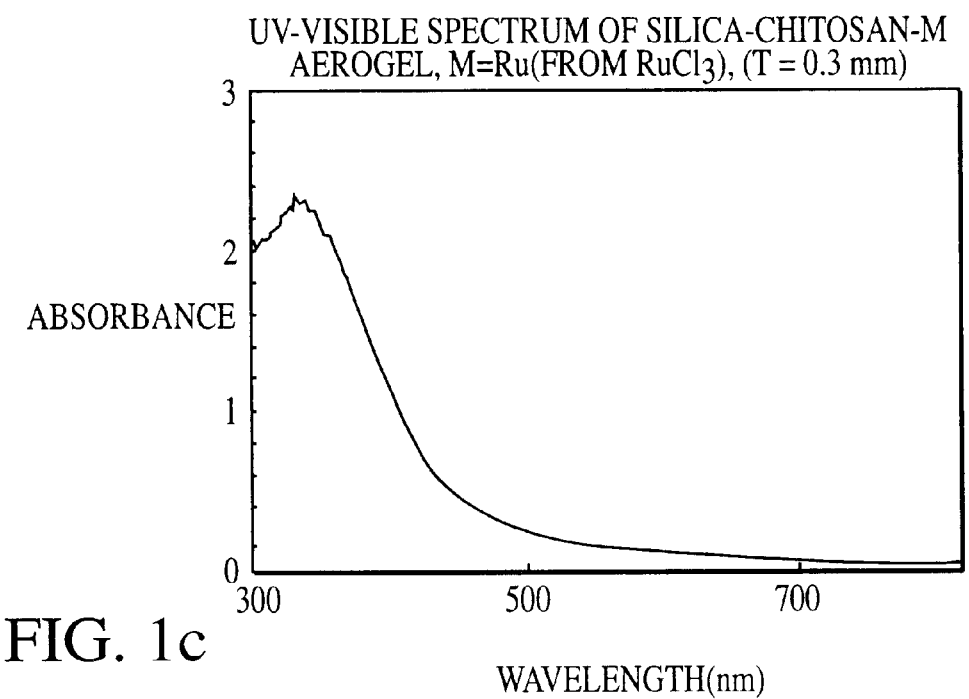
Figure 1D:
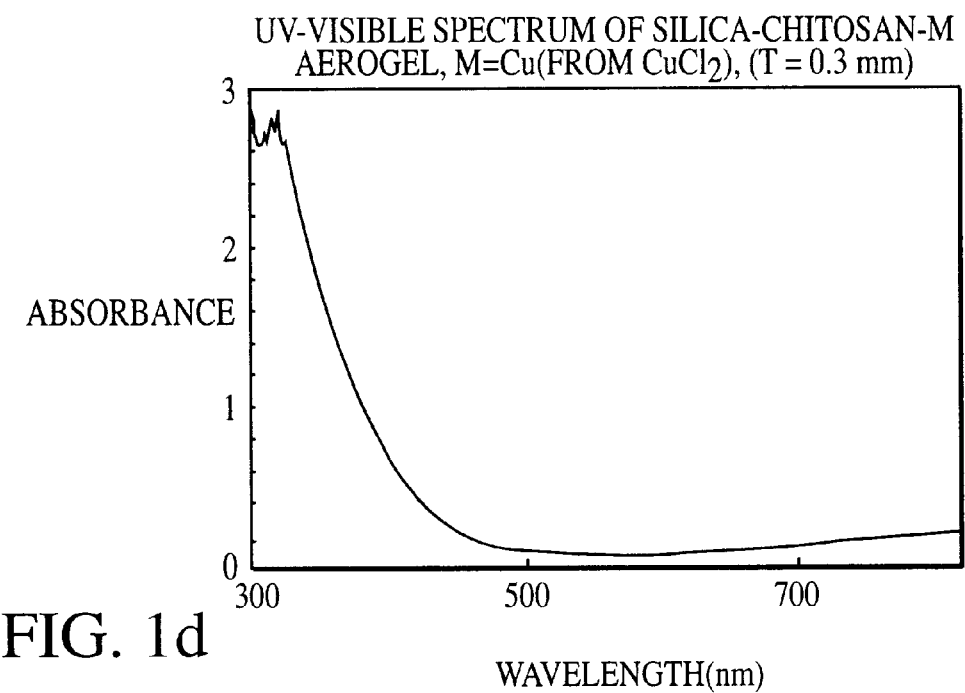
Figure 1E:
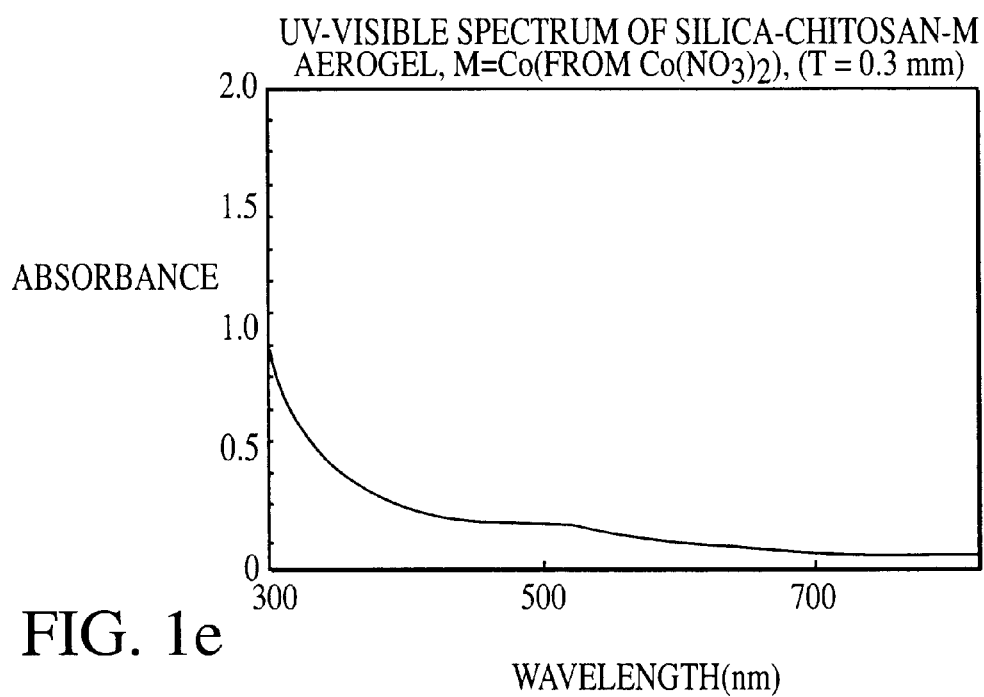
Figure 1F:
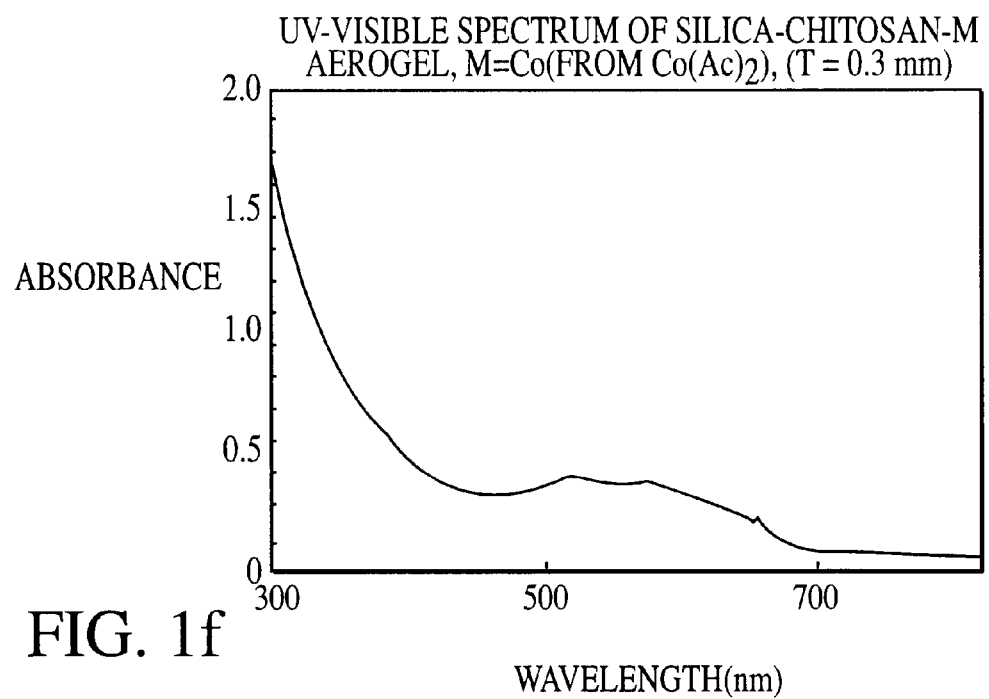
Figure 2A:
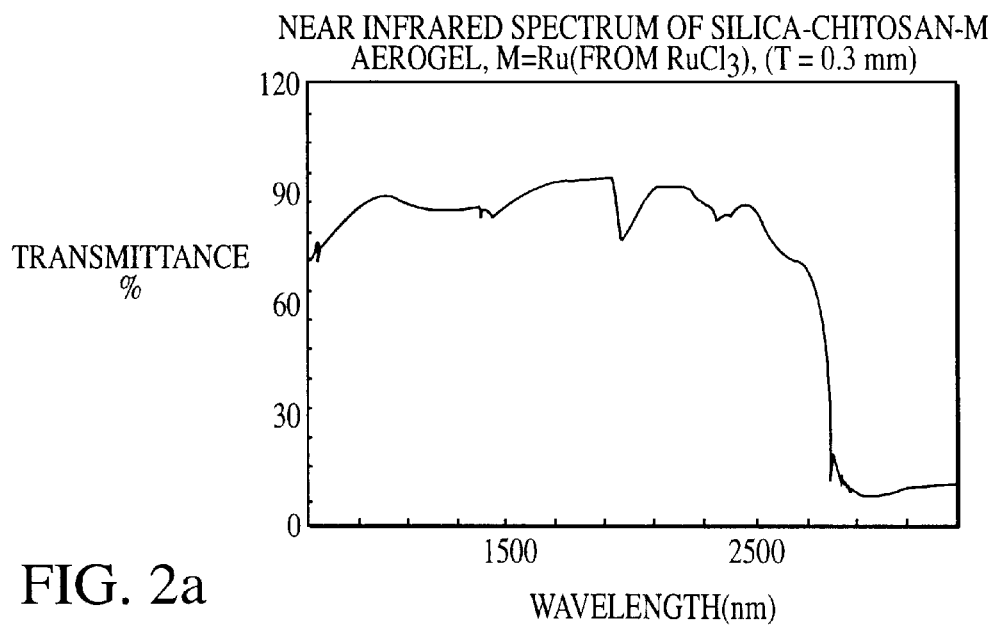
FIGS. 2a to 2e illustrate the near infrared range spectra of various silica-chitosan-M aerogels in accordance with a preferred aspect of the present invention.
Figure 2B:
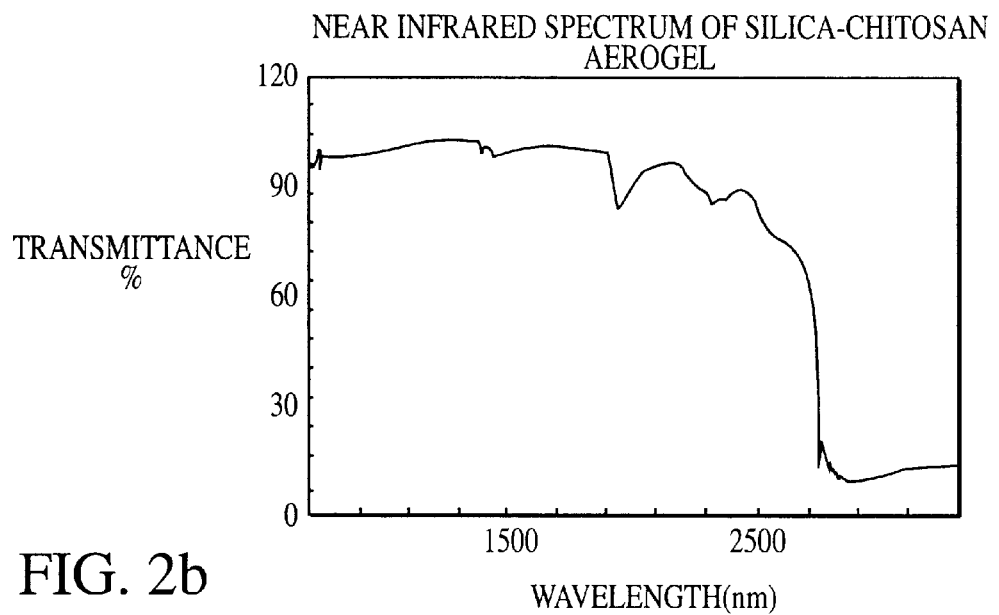
Figure 2C:
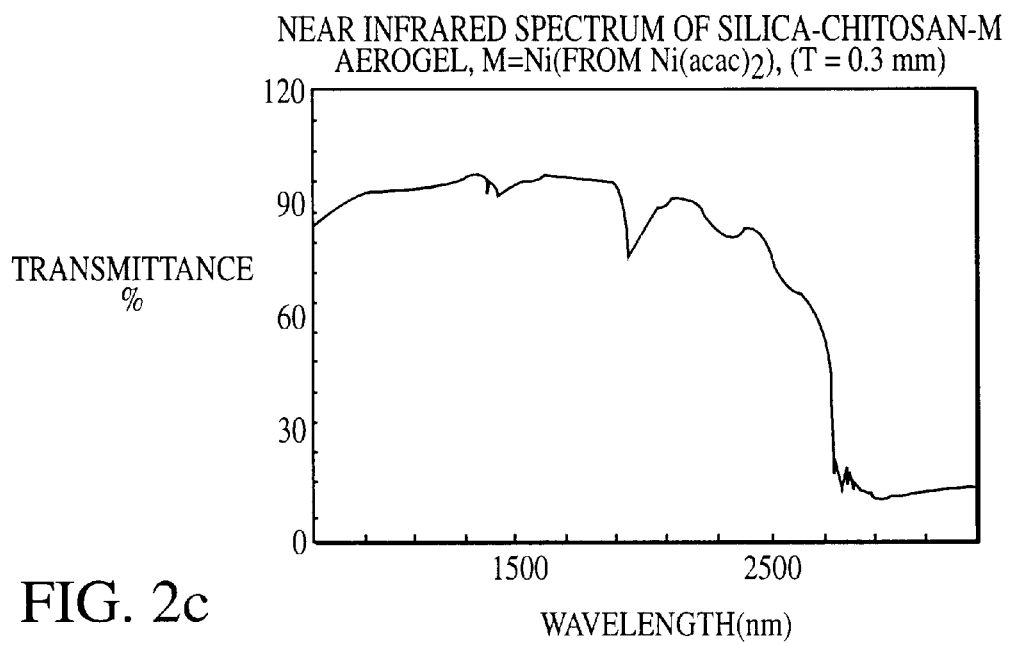
Figure 2D:
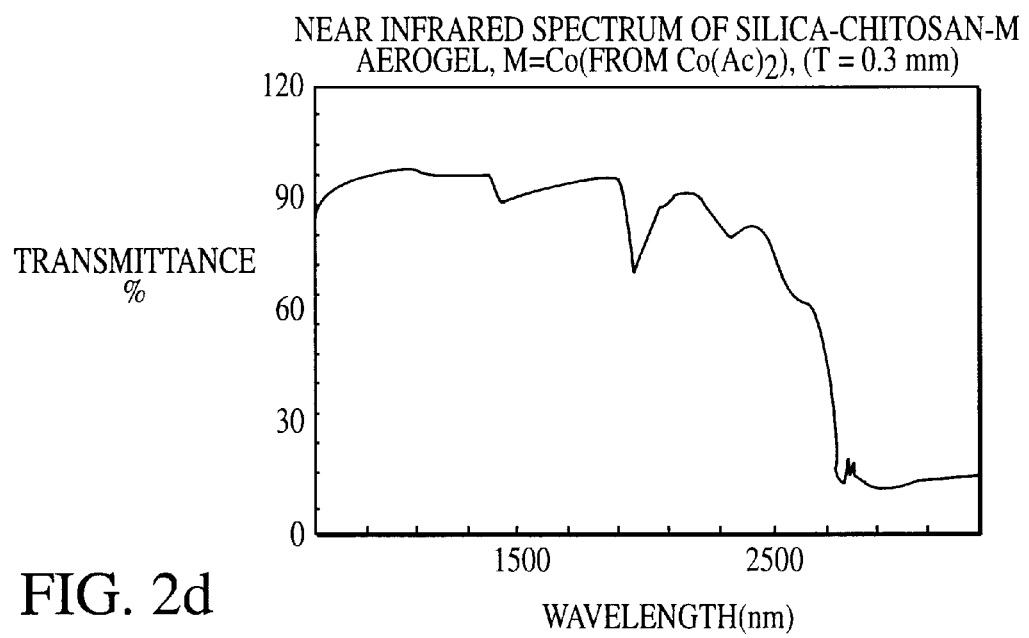
Figure 2E:
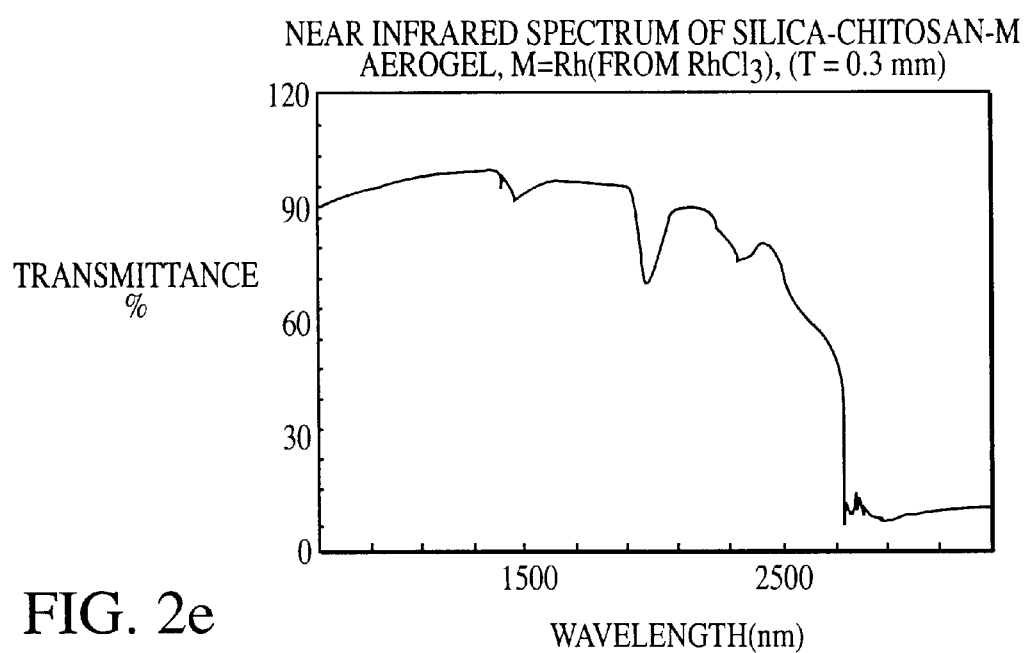

The present invention concerns printing mediums that include new aerogels that comprise silica, at least one organic polymer having polar functional groups, and at least one metal ion. More particularly, the invention concerns printing mediums based upon aerogels that comprise an organic polymer that interacts with the metal ion through ionic, coordinate covalent, or covalent bonds. The invention also concerns transparent aerogel monoliths comprising silica, an organic polymer having polar functional groups, and a metal-containing species. The present invention also provides a process for producing some of these novel materials, in which the silica source, the organic polymer, a metal ion containing source, and liquid form a clear gel. In accordance with this process, the gel may be placed in a liquid extractable form by replacing the liquid with an alcohol in the gel without removing the constituents completely, and then the alcohol and remaining liquid are extracted from the gel by supercritical extraction using carbon dioxide. This process can include an adjustment of the pH of the system at each stage to control the rate of gelation and the sol-gel morphology, or to control the solubility, configuration and metal ion coordinating capability of the polar functional polymer. The present invention process can be carried out in stages such that the silica source and the polar functional organic polymer form a clear sol which then forms a clear gel, which may be treated to adjust the pH. The wet gel is then reacted with a metal ion source to form a clear gel, the gel liquid is then replaced with alcohol. A supercritical extraction operation is carried out to provide a monolithic aerogel.

These monolithic aerogels in accordance with the present invention possess a number of properties that lead to novel applications. They have high surface areas and high void volumes related to their low densities. Monolith is a word used in its conventional sense, as "a single stone or block of stone" (Webster's New Collegiate Dictionary), in order to distinguish the materials of this invention (before any intentional fracturing, powdering or other mechanical processes) from the types of small particles or aggregate particles commonly obtained in the prior art. Typically, the monoliths obtained are limited only by the size of the supercritical extraction equipment and pieces as large as about 50 mm×50 mm have been prepared. Their thicknesses may typically vary from about 0.02 mm to about 4 mm. Greater or lesser thicknesses are contemplated. The monolithic structure permits applications of these materials as optical elements of low refractive index, optical filters, gas and liquid absorbent materials, gas filters, as well as those that are possible with the smaller particles.

The term "polymer" as utilized herein generally refers to a macromolecular substance composed of repeating atomic groups, i.e. monomers. The term encompasses all types of polymers such as homopolymers, copolymers, dimers, trimers, oligomers, for example.

The aerogels of the present invention may comprise metal ions that can interact with reactive gases and unreactive but absorbable gases to yield a changed material whose changes can be probed to indicate the presence of the molecules. The aerogels may comprise metal ions that can interact with many dye molecules to immobilize them by a mordanting interaction. Moreover, the aerogels can be transparent to light in regions of interest, such that they may be used as optical filters, active optical elements, and detectors based on the optical, magnetic, and magneto-optic and related properties of the metals and their surroundings. The aerogels of the present invention have pore sizes in the range of about 2 to about 6 nanometers, very high surface areas, and may comprise metals that exhibit appropriate molecule metal interactions and chemical reactions for catalytic activity.

It has been discovered that certain organic polymers with polar functional groups are particularly useful constituents in such aerogels. These preferred organic polymers can be dissolved in the solution in which the silica source is provided, which form with the silica source, a clear sol and subsequent gel, which can be placed in a chemical form that leads to interaction with the metal ions at a pH at which the silica network is stable, and which are not extracted to a deleterious extent by interactions with solutions, liquids, or supercritical fluid in the preparation process. For the case in which the silica source is an alkoxide, such as tetraethyl orthosilicate (TEOS), formation of a monolithic gel occurs preferably under acidic conditions with water and alcohol present. Note that TEOS can also be written as tetraethoxy silane, and it belongs to the class that includes tetraalkoxysilanes in general, trialkoxy alkyl silanes, dialkoxy dialkyl silanes and other closely related compounds, which can hydrolyze to give 2,3, or 4 hydroxy groups with which to form part or all of a silica network, such as would be well known to one reasonably skilled in the art. Other alternate silica sources could be employed. Thus, the preferred organic polymer must have sufficient solubility to permit its incorporation in the sol and not precipitate to produce a visual cloudiness during gelation. Moreover, it must form a sufficiently strong interaction with the other constituents of the gel such that it is not extracted to a deleterious extent by solutions used to introduce the metal ion containing species and so that it is not extracted to such an extent by alcohol that is used to replace other liquids in preparation for the supercritical extraction. Finally, the preferred organic polymer must have the functionality necessary to interact with the metal ion containing species under conditions, such as conditions reflected by pH or temperature, in which both the silica and the polymer is chemically stable.

A preferred organic polymer that has these characteristics is chitosan, which is the name given to materials derived from chitin by deacylation. These materials vary in degree of deacylation and molecular weight according to the source of the chitin and the deacylation process. Commercial chitosan typically is prepared from chitin from the skin or shell of anthropods and thus often is a recovered waste product of the fishing industry. Chitosans in the range of 50 to 100% deacylated (replacement of 50 to 100% of acylamine groups by amine groups) and molecular weights in the 35,000 to 3,000,000 Dalton can be used. More preferred are chitosans in the range of weight average molecular weights of 150,000 to 2,500,000 g/mol and degrees of deacylation from about 70 to about 100%. Most preferred are chitosans with such weights of 300,000 to 2,100,000 g/mol and degrees of deacylation from about 80 to about 100%.

Chitosan is a copolymer containing both beta-(1–4)-2-acetamido-2-deoxy-D-glucose and beta-1(1–4)-2-amino-2- deoxy-D-glucose units. The amine group of the deacylated units can form coordinate covalent bonds to metal ions by complexation. The extent to which the amine group, which coordinates to metal ions, is present relative to its protonated form depends on the pH of the system. A characteristic of chitosan that is unusual for compounds with primary amine groups is that the pKa is about 6.3. This means that a significant fraction of the groups are in the amine form at pH less than 7. Furthermore, this also means that chitosan can coordinate effectively at pH less than 7 rather than at the higher pH values at which the silica network is subject to base hydrolysis and instability.

Another characteristic of chitosan is that it has OH groups. Without being limited to any particular theory, it is contemplated that the OH groups assist in the interaction of the polymer with the silica as it is present in the various stages of preparation and in the final form of aerogel material. This characteristic as well as the interactions of other groups of the chitosan copolymer with the silica, and of the OH groups with the metal ions and with other chitosan units may be the reason that the polymer is not extracted to a deleterious extent when the wet gel is exposed to aqueous metal ion containing solutions and alcohols.

Other organic polymers suitable for forming the aerogels of this invention include, but are not limited to, alginic acid, gelatin, pectic acid (from apples), carboxylate-modified poly (acrylamide), carboxylate modified chitosan, polyvinyl alcohol that is about 100% hydrolyzed and of weight average molecular weight in the 100,000 to 200,000 range, poly (acrylic acid). Other carbohydrates with polar groups, such as carrageenans, modified starches such as amylopectin, epichlorohydrin or alkyene oxide modified amylopecin and certain dextrins. Clearly polymers such as polyamines and others fulfilling the role of the polymer but whose polar groups are thiol, thioether, phosphate, also could be useful in the formation of these aerogels using the methods of the invention.

It has been discovered that the aerogels of this invention can be friable so that they are easily broken into relatively small pieces for use as particles. The minimum particle size is about 25 nanometers. When this property is combined with the ability to absorb liquids containing dyes, the aerogel of this invention provides a novel particle for use on or as part of imaging surfaces such as those imaged with solvent borne inks. When the friability is combined with the inclusion of catalytically useful metal ions and the reduction, oxidation and other reaction products, the aerogel of the present invention can be used as a catalyst agent or as a vehicle therefor.

Another important feature of the aerogels of the present invention is their transparency to light in certain wavelength regions. This feature, particularly when taken on combination with the high surface areas and reactive metal ions and absorptive structure of the aerogels, has provided a wide array of novel uses for the aerogels as detection elements and optical elements. This transparency is immediately evident in certain regions of the visible spectrum, at which they are colored but relatively transparent, resembling pieces of colored but clear glass. Absorption of gases by the aerogels can cause a color change in the aerogel. Representative examples of gases that may be absorbed by the aerogels of the present invention, include but are not limited to, CO, $H_2$, $H_2O$, $NH_3$, $CO_2$, $N_2O_4$, NO, and $NO_X$. Thus, gas absorption can be detected using the aerogel as the detection element and a suitable light source and detector. Absorption of gases which cause changes to the infrared or near infrared spectrum of the aerogels in the region where the aerogels have a spectral transmission of greater than about 10% provides an element for a detector for those gases. It has been discovered that detection of CO, NO, and $N_2O_4$ with detection in the mid infrared region provides a detector element for these gases.

The monolithic aerogels of the invention have high porosity and surface area and comprise metal containing species, such as metal ions. A representative listing of suitable metal ions includes, but is not limited to, Co, Cu, Fe, Cr, Ni, Mn, Rh, Ru, Ir, Pd, Pt, Yb, Er, Eu, Sm, and Dy. The metal ions can be selected from those that interact with selected impurities in a gas or gas stream and remove or transform them. Thus, the invention of the aerogels as gas absorber in a setting where a monolithic material is required is exemplified by the absorbance of NO by a ruthenium—containing chitosan silica aerogel.

The present invention is further illustrated by the following examples. It is to be understood that the present invention is not limited to the examples, and various changes and modifications can be made in the invention without departing from the spirit and scope thereof.

EXAMPLES

Example 1

A mixture of 12.5 mL of tetraethylorthosilicate (TEOS), 40 mL of an aqueous solution containing 1 wt % of 80% deacylated chitosan (supplied by Fluke, molecular weight of 2,000,000) and 1 wt % acetic acid, and 0.9 mL of glacial acetic acid was prepared, and stirred at room temperature (about 25° C.) for 6–9 hours. A clear, colorless and viscous sol formed, and a portion of it was poured into a polystyrene box. The box is approximately 2 in.×2 in. and about 1 in. high. The sol was poured into the box to a depth of about 1 to 2 mm., and the lid was placed on the box. This film was allowed to gel and then to age overnight. Then about 10 mL of a solution of absolute ethanol and ammonium hydroxide was added to the gel. The solution contained the amount of ammonium hydroxide required to adjust the pH of the solution, once in contact with the gel, to about 7.0. (Note that even though the solution added was alcohol, the solution present after solvent exchange and neutralization was water based, so the pH value is a valid parameter.) After this was accomplished, the supernatant solution was replaced with absolute alcohol, the lid was replaced, and the alcohol remained in contact with the wet gel for a few hours. This was repeated at least four times over several days to produce a wet gel in which the liquid was nearly all ethanol.

Example 2

The wet gel produced in Example 1 was placed in the pressure vessel of a supercritical fluid extractor, and the solvent was extracted with carbon dioxide ($CO_2$) under supercritical conditions, which reached 1400 psi and 35° C. The result was a clear, hard, brittle monolithic aerogel, which can be labeled Si—X, for silica and chitosan containing material. Its density was found to be 0.25 g/cm$^3$, and it BET surface area was found to be 673 m$^2$/g.

Aerogels of this type with the chitosan to silica dry weight ratios of 5:95, 10:90, and 20:80 were prepared. These aerogels utilized chitosan materials of molecular weights 2,000,000; 750,000; and 70,000.

Example 3

A wet gel produced as in Example 1 was treated to one more step, in which the supernatant ethanol was replaced by a solution made by dissolving a compound of a transition metal in ethanol. The lid was placed on the box, and the interaction between the gel and solution was allowed to proceed for three days. Thus, one gel was treated with one solution. Then the wet gel was processed by supercritical fluid extraction, as described above, to produce a metal-ion-containing aerogel. In this example, the metal ion containing compound was 0.01 M $RhCl_3$, and the final aerogel was a thin clear, yellow-orange monolithic solid. Its density was found to be 0.27 g/cm$^3$, and its BET surface area was found to be 555 m$^2$/g. Its refractive index was measured at 632.8 nm using a Metricon 2010 Prism Coupling Instrument (Metricon Corporation) and found to be 1.17. This aerogel is labeled Si—X—$RhCl_3$ (or Si—X—$RhCl_3$ (0.01M).

Aerogels containing other metals were prepared. They were prepared with treatment solution concentrations ranging from 0.001 to about 0.1 M, with a range of chitosan to silica dry weight ratios. The compounds used for treatment included the following: rhodium trichloride, ruthenium trichloride, molybdenum trichloride, cobalt (II) acetylacetonate (Co(acac)$_2$), Ni acetylacetonate (Ni(acac)$_2$), cobalt chloride, cobalt nitrate, silver nitrate, copper chloride, manganous chloride, chloro-1,5-cyclooctadiene iridium(1) dimer,and palladium chloride. Nickel nitrate and nickel chloride could also be used.

These aerogels exhibited similar properties. For example, the density of the $SiO_2$—X—$RuCl_3$ (0.02M) aerogel, prepared using a 0.02 M $RuCl_3$ was found to be 0.27 g/cm$^3$, its BET surface area was 494 m$^2$/g., and it refractive index at 632.8 nm. was found to be 1.17. As another example of this type, $SiO_2$—X—Co (0.01M) had a density of 0.26, a BET surface area of 500 m$^2$/g, and a refractive index at 632.8 nm of 1.14. All of the aerogels could be obtained as clear, hard, brittle monolithic pieces. All BET surface areas obtained were in the 382 to 957 m$^2$/g range, and densities in the 0.15 to 0.32 g/cm$^3$ range.

Example 4

A mixture of 3.1 mL of tetraethylorthosilicate (TEOS), 10 mL of an aqueous solution containing 1 wt % of 80% deacylated chitosan and 1 wt % acetic acid, and 0.2 mL of glacial acetic acid was prepared, and stirred at room temperature (about 25° C.) for 6–9 hours. During the initial stage of stirring, 2.5 mL of an aqueous solution of potassium tetrachloroplatinate was added drop by drop very slowly. The amount of potassium tetrachloroplatinate added was one Pt per eight amine groups of chitosan. During the stirring for 7 hours, the viscosity increased and the color of the clear gel became a bright yellow. Once this sol was formed, a portion of it was poured into a polystyrene box. The box is approximately 2 in.×2 in. and about 1 in. high. The sol was poured into the box to a depth of about 1 to 2 mm., and the lid was placed on the box. This film was allowed to gel and then to age overnight. Then about 10 mL of a solution of absolute ethanol and ammonium hydroxide was added to the gel. The solution contained the amount of ammonium hydroxide required to adjust the pH of the solution, once in contact with the gel, to about 7.0. After this was accomplished, the supernatant solution was replaced with absolute alcohol, the lid was replaced, and the alcohol remained in contact with the wet gel for a few hours. This was repeated at least four times over several days to produce a wet gel in which the liquid was nearly all ethanol. The wet gel produced was placed in the pressure vessel of a supercritical fluid extractor, and the solvent was extracted with carbon dioxide ($CO_2$) under supercritical conditions.

Example 5

A $SiO_2$—X—Rh(III) aerogel sample was placed in a cell for measuring its infrared spectrum and controlling the surrounding atmosphere. The cell body was made of glass, and the windows were made of potassium bromide crystals. The air in the cell was pumped out and the infrared spectrum of the aerogel film was measured. Then, carbon monoxide (CO) was admitted to the cell at a pressure of 0.1 atmosphere. After about 30 minutes the CO was evacuated and the infrared spectrum of the exposed aerogel was measured. It showed the presence of three new infrared absorption bands, at 2032 and 2090, and at 2137 cm−1. The first two are assigned to a Rh(I)(CO)$_2$, or rhodium(I) dicarbonyl species, as shown in the paper A Kinetic Study of the Catalytic Oxidation of CO over Nafion-Supported Rhodium, Ruthenium and Platinum, V. D. Mattera, Jr., D. M. Barnes, S. N. Chaudhuri, W. M. Risen, Jr. and R. D. Gonzalez, *J. Physical Chemistry*, 90, 4819(1986). The third band is due to physical adsorption of the CO by the aerogel. These results are that the aerogel adsorbs CO and that it reacts with it in a manner that is detectable by infrared spectroscopy. In addition, it shows that some of the Rh(III) was reduced to Rh(I).

Example 6

Example 5 was repeated but the CO gas was replaced with NO, and the result was the appearance of an infrared band at 1727 cm−1.

Example 7

Example 5 was repeated but the aerogel was $SiO_2$—X—$RuCl_3$. The infrared spectrum showed new bands at 1968, 2018, 2080, and 2144 cm−1. The first is assigned to a Ru(II) carbonyl, the next two to a Ru(III) carbonyl and the last to physically absorbed CO, based on the paper.

Example 8

Example 6 was repeated but the aerogel was $SiO_2$—X—$PdCl_2$ and the interaction with NO gas produced new infrared bands at 1820 and 1858 cm−1.

Example 9

In a typical preparation of an aerogel based on a carboxylic acid containing polymer, 40 mL of a 1 wt. % pectic acid aqueous solution at pH4 was combined with 7.6 mL tetramethylorthosilicate (TMOS) at about 25° C. After about 10 min of stirring, the solution became clear and homogeneous. After being stirring for an additional 1.5 hours, the solution was placed in a polystyrene box, of the type described above. About 4 mL of solution was placed in each box, and the lid was placed on the box. The sol aged overnight to form a clear colorless gel. Then the reaction of these films with various metals was carried out by placing the solutions containing the metal ion in contact with the wet gel. Then the gel liquid was replaced in stages beginning with a solution that was 3:1, V/V water to ethanol and ending with alcohol. Finally, the wet gel containing ethanol as its primary liquid had the liquid extracted by supercritical fluid extraction with $CO_2$. This method was used to prepare aerogels comprising Er(III), Yb(III), Sm(III), and Dy(III) In several cases, two or more lanthanide metal ion containing compounds were added together. For example, Yb(III) and Er(III) were so combined. Aerogel monoliths were obtained.

Example 10

A sample of the $SiO_2$—X aerogel based on 10:90 ratio, was touched with a drop from a micropipet of each of the following dyes and ink, selected to have a range of colors, solvent and molecular type: eriochrome black T in methanol, phenyl red in water, crystal violet in water, malachite green in water, methyl red in ethanol, and standard pen recorder blue ( for Hewlett Packard pen recorder). For comparison, the same experiment was done with a piece of $SiO_2$—X—Cu aerogel, $SiO_2$-pectic acid—Yb aerogel, $SiO_2$—X—Co aerogel, and $SiO_2$—X—Ni aerogel, as well as a piece of aerogel made without either the organic polymer or the metal ion containing species, which will be labeled "$SiO_2$ aerogel prep". The results were as follows. The ink and dyes were taken up very fast by the aerogels. The drops dried very fast in terms of spread of the image, such that the shape of the image was essentially the of the drop and its placement on the aerogel monolith. By using aerogel monoliths of about 0.3 mm thickness, it was possible to make the foregoing observations concerning lateral spread, but also about spread through the thickness and the effect on transparency. The with small drop sizes relative to the thickness of the monoliths, the whole drop could be absorbed without noticeable spread laterally and without penetrating to the back side of the aerogel through its thickness. In addition, the interaction of the dye solutions and ink with the aerogels was found to be observable through the still transparent samples. The colors of the dyes as absorbed are given in Table 1.

applied to these films. The aerogels of this invention took up the dyes with essentially the same colors as observed on the monoliths and did so faster and with greater control of lateral spread than either the silica gel from the tic plate or the Degussa aerosil.

Example 13

A powdered sample of $SiO_2$—X—Co(II) aerogel was powdered and placed in a glass tube and studied by electron spin resonance spectroscopy. Similarly, the esr spectrum of the $SiO_2$—X—Rh(III) and $SiO_2$—X—Ru(III) materials were studied. In all cases, the esr spectra characteristic of the metal ions in their environment and oxidation state were observed.

Example 14

A monolith of $SiO_2$—X—Co(II) was placed in a glass cell consisting of a glass tube with glass windows attached to the ends and a stopcock attached to the side, and the cell was evacuated at 25° C. and the visible spectrum was measured in transmission. Then the sample was exposed to the vapors of water. The evident color change was recorded spectro-

TABLE I

| | chloro phenyl red (in $H_2O$) | phenyl red (in $H_2O$) | eriochrome black T (in $CH_3OH$) | crystal violet (in $H_2O$) | methyl red (in EtOH) | blue pen recorder ink | malachite green (in $H_2O$) |
|---|---|---|---|---|---|---|---|
| $SiO_2$ aerogel | brownish red | yellow orange | burgundy | purple blue | red | | green |
| $SiO_2$ - chitosan aerogel | dark brown | red | black | purple blue | red | | green |
| $SiO_2$ - chitosan-Co | black | deep brick red | black-violet | violet | pink-orange | | blue |
| $SiO_2$ - chitosan-Cu | brown | orange | black | violet | pink | deep blue | blue green |
| $SiO_2$ - chitosan Ni | black | red | violet | violet | pale red | | blue |
| Aerosil 200 Degussa com'cl Lot No: c/2/30c | brown | orange red | brownish red | purple blue | red | | green |
| TLC plate | brown | orange red | brown | deep purple | red | | green |

Example 11

Samples of powder of the $SiO_2$ aerogel prep, $SiO_2$—X aerogel, $SiO_2$ from a standard thin layer chromatography (tic) plate, and $SiO_2$ aerosil (Degussa Aerosil 200, Lot c/2/30c), and of $SiO_2$—X—Cu aerogel. The uptake of the solutions to apparently dry particles was instantaneous with the aerogels prepared with a chitosan to silica dry weight ratio of 10:90 as examples of this invention. It was observed to be much faster than the up take by the Degussa Aerosil 200. The results also are included in Table 1.

Example 12

Samples of the particles of Example 11 were dispersed in a solution of polyvinyl alcohol (100% hydrolyzed, molecular weight 115,000, Cat. #002 from Scientific Products), and cast onto microscope slides, and dried at about 70° C. for about 10 minutes. Then drops of the dye solutions were scopically. This experiment was repeated with $SiO_2$—X—Cu(II) aerogel and the dried material was exposed to water vapor. The evident color change was recorded spectroscopically. The result in the visible region of exposing $SiO_2$—X—Ru(III) to CO is a color change from the red of the original material to a light yellow.

Example 15

A piece of SiO2-X aerogel was placed in a 0.01M nickel nitrate solution in ethanol. It was removed after about 10 seconds and then it was allowed to dry in the air. Then it was rinsed by dipping it into ethanol for about 3 seconds. The light green color of the gel showed that it had absorbed nickel ions.

Example 16

A piece of each of the following $SiO_2$—X—M aerogels, those of Er(III), Yb(III), and Sm(III) measuring about 1 cm by 2 cm, was placed in a furnace in the air and heated to 800° C. The aerogels collapsed to form dense glassy materials.

Example 17

A SiO2-X—Rh(III) aerogel was placed in a cell and dehydrated in vacuo at 95° C. for 10 hours, and then exposed to CO gas for about 1.5 hours at 0.5 atm. pressure. The infrared spectrum was measured. After subtraction of the spectrum of the background, the spectrum showed bands at 1821, 2025, 2097, and 2138, and a shoulder at about 2000 $cm^{-1}$, which are believed to be due to bridging CO on Rh(0) (1821), terminally bound CO on reduced (Rh(0)) (2000), terminally bound CO on Rh(I) (2025, 2097), and physically absorbed CO (2138).

Example 18

A sample of $SiO_2$—X—Rh(III) aerogel was dehydrated at 95° C. in vacuo and treated with $H_2$ at 100° C. and 0.5 atm. for about 2 hours. Then it was reacted with CO at 0.3 atm. for 1.5 hours. The infrared spectrum of the product, less that of the dehydrated material, exhibited bands at 1824, 2002, 2022, and 2082 $cm^{-1}$, which are believed to be characteristic of CO on Rh(0) and Rh(I). No bands were observed in the region 2100 to 2200, which is the region in which a band for CO absorbed on the original material containing Rh(III) was seen.

Example 19

A $SiO_2$—X—Rh(III) aerogel was analyzed to determine the Rh(III) loading. One piece of the aerogel was studied by thermogravimetric analysis, and it was found that 15% of the mass was lost on heating the material under inert gas flow from 25 to 300° C. Another piece was decomposed in strong base (NaOH). The basic solution was neutralized with HCl, taken to pH 3 with HCl, filtered and diluted quantitatively. Its spectrum was measured in the UV-visible region and compared to a calibration based on rhodium chloride solutions in HCl solution. These results were combined to yield a value of 3% (w/w) for Rh(III).

Discussion of the Examples

Two processes for making monolithic aerogels comprising silica, a polar functional organic polymer, and a metal-ion-containing species have been described. The compositions containing the polar functional organic polymer, such as an amine functional polymer, form aerogels that are clear, transparent, hard, brittle, and friable with transition metals. The aerogels comprising lanthanide ions were prepared using the carboxylate functional polymer. Additional preparations were made using polymers selected from poly (acrylic acid), alginic acid, gelatin, carboxylate modified poly(acrylamide).

FIG. 1 shows the ultraviolet-visible range spectra, presented in absorbance as a function of wavelength in the 300–820 nm range, of 0.3 mm thick (T=0.3 mm) monolithic pieces of silica-chitosan-metal aerogels in accordance with a preferred embodiment of the present invention. FIG. 1a is a sample comprising rhodium ions with the source of Rh having been rhodium trichloride; 1b is a sample comprising nickel ions with the source of Ni having been nickel nitrate; 1c is a sample comprising ruthenium ions with the source of Ru having been ruthenium chloride; 1d is a sample comprising copper ions with the source of Cu having been copper chloride; 1e is a sample comprising cobalt ions with the source of Co having been cobalt nitrate; and 1f is a sample comprising cobalt ions with the source of Co having been cobalt acetate.

FIG. 2 shows the near infrared range spectra, presented in transmittance (percent transmission) as a function of wavelength in the 700–3100 nm range, of 0.3 mm thick (T=0.3 mm) monolithic pieces of a silica-chitosan aerogel and silica-chitosan-metal aerogels in accordance with the preferred embodiment of the present invention. FIG. 2a is a sample comprising ruthenium ions with the source of Ru having been ruthernium trichloride; 2b is a sample of the silica-chitosan aerogel with no metal ions; 2c is a sample comprising nickel ions with the source of Ni having been nickel acetylacetonate; 2d is a sample comprising cobalt ions with the source of Co having been cobalt acetate; and 2e is a sample comprising rhodium ions with the source of Rh having been rhodium chloride.

Figure 3:
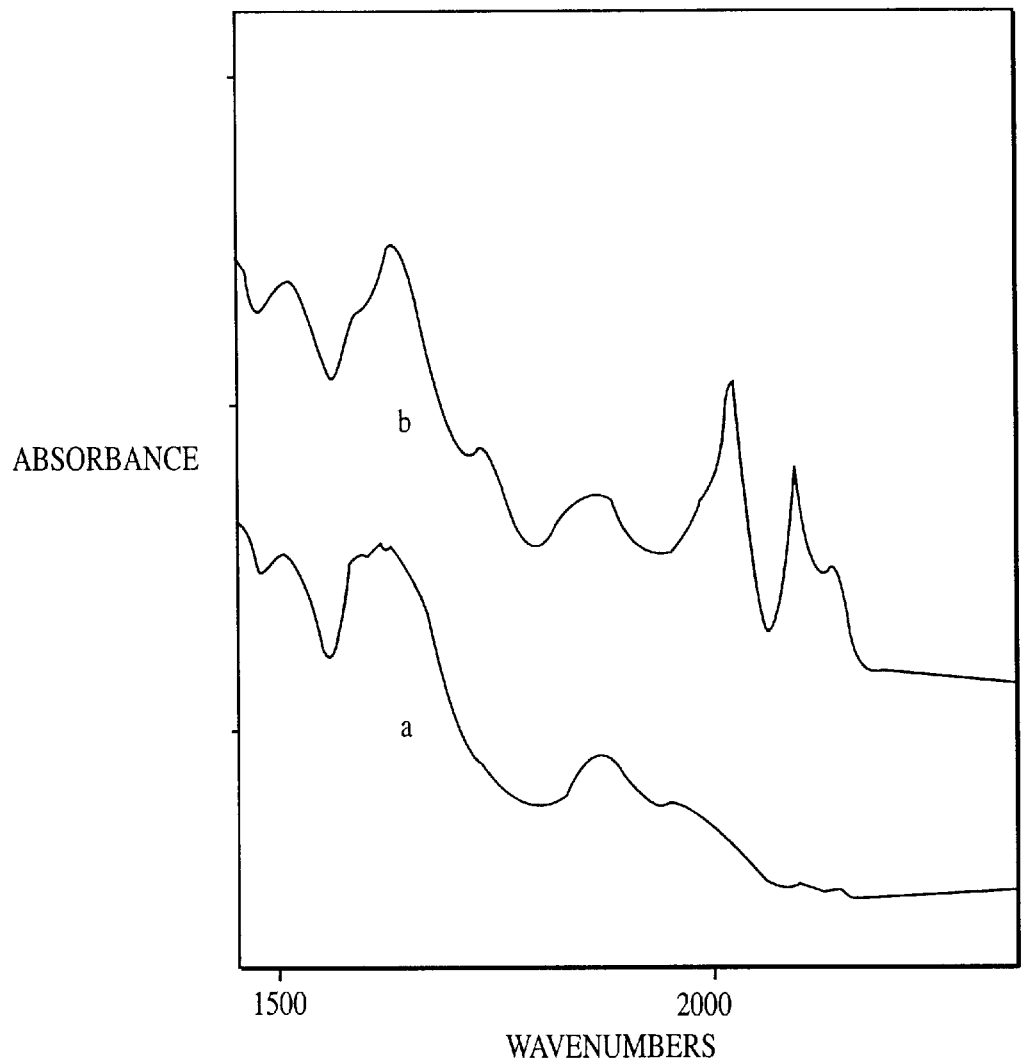
FIG. 3 illustrates the infrared spectra of a silica-chitosan rhodium aerogel, presented as absorbance as a function of wave number, before and after exposure to CO.

FIG. 3 shows the infrared spectra, presented as absorbance as a function of wave number in the 1450–2350 wave number (1/cm) region, of (a) a monolithic 0.2 mm thick piece of a preferred embodiment silica-chitosan-rhodium aerogel dehydrated at 95° C. and 0.001 Torr pressure for 10 hours, and (b) the same sample after exposure to CO at 380 Torr at 25° C. for 1.5 hours followed by evacuation of the sample chamber to 0.001 Torr for 1 hour. The absorbance scales are offset arbitrarily for display.

Figure 4:
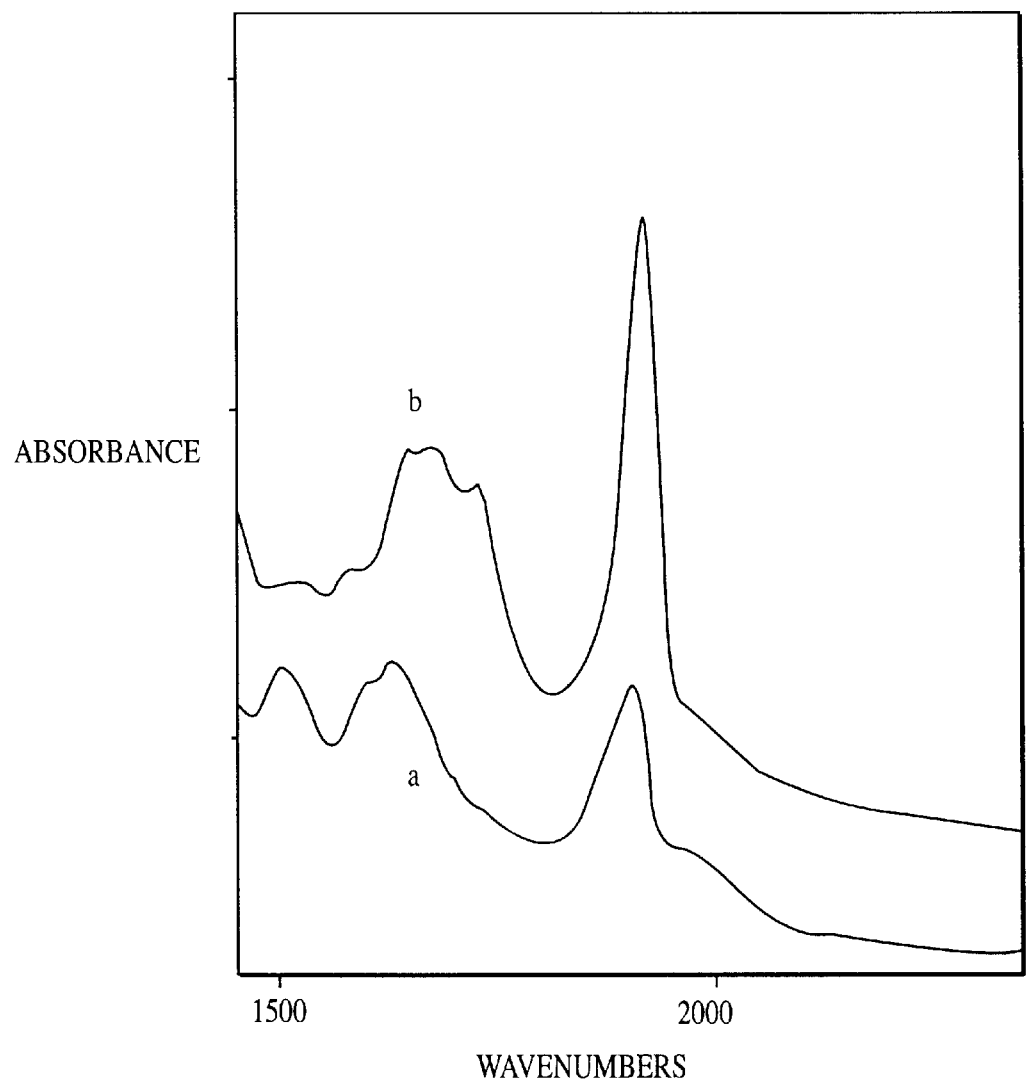
FIG. 4 illustrates the infrared spectra of a silica-chitosan ruthenium aerogel, presented as absorbance as a function of wave number, before and after exposure to NO.

FIG. 4 shows the infrared spectra, presented as absorbance as a function of wave number in the 1450–2350 wave number (1/cm) region, of (a) a monolithic 0.2 mm thick piece of a preferred embodiment silica-chitosan-ruthenium aerogel dehydrated at 95° C. and 0.001 Torr pressure for 10 hours, and (b) the same sample after exposure to NO at 76 Torr at 25° C. for 10 minutes followed by evacuation of the sample chamber to 0.001 Torr for 0.5 hour. The absorbance scales are offset arbitrarily for display.

The absorption of gases from an atmosphere has been demonstrated for the case of CO and NO. Once absorbed, the gases can undergo further reactions, as demonstrated in the case of metal ion reduction for Rh(II) to Rh(I) and Ru (III) to Ru(II). These are typical reactions for catalysts that are useful in a range of reactions including hydroformylations. Also once absorbed, the spectrum of the aerogel is changed so that the aerogel can be used as a detector for the presence of the gases. This detection can be done by optical spectroscopy in the infrared, visible or ultraviolet regions, light scattering by Raman, or other dispersive or non-dispersive methods, by spin resonance spectroscopy using electron or nuclear spins, or by magnetic interactions. Thus, the changes that the aerogels undergo when they interact with gas molecules or other molecules can be detected by these means. In addition to changes in light transmission, the magnetic changes that result from the oxidation or reduction of the adsorbate or absorbent are observable magnetically. It is known that aerogels comprising silica are useful in some forms of particle detection, such as Chrenkov radiation detectors. The incorporation of the organic polymers and metal ions selected from a broad group of metals provides a new class of particle detectors whose advantage is in the metal specific interactions with the particles.

The optical properties of the aerogels are novel in that they reflect the presence of the metal ions (as well as those of the silica and polymer) and so they may be utilized as detector elements for the presence of species that are absorbed by the aerogel and so can be observed through their presence in that environment by spectroscopic means. Another novel feature of the aerogels is that the metal ion properties can be obtained in a clear monolithic structure with a low refractive index. This provides a new medium for optical elements.

The high absorbance of liquids by the aerogels tested and their apparent ability to mordant dyes contained in the liquids, has been shown to make the aerogels, either in monolithic or particulate form, suitable for their use in imaging systems. Thus, the use of these materials in the coating on the imaging layer of paper, could produce a rapid drying agent to absorb ink and analogous fluids from other imaging systems.

Based on the behavior of the aerogels containing rodium, ruthenium, platinum, and palladium, and the field of catalysis using species of these elements on high surface area supports, it is contemplated that the materials of this invention will function as catalysts for many reactions beyond those demonstrated. The catalysts of the Fischer Tropsch reaction, the reduction of nitrogen oxides, and the oxidation of CO, and the oxidation of nitrogen oxides are particularly contemplated.

Table 2 set forth below, lists physical properties for several preferred embodiment silica-chitosan aerogels in accordance with the present invention.

TABLE 2

Physical Properties of Transition Metal Containing Silica-Chitosan Aerogels

| Sample Name | Density (g/cm$^3$) | Refractive Index* (632.8 nm) | BET Surface Area (m$^2$/g) |
|---|---|---|---|
| Silica-Chitosan Aerogel (Silica-X) | ~0.25 | 1.14 | 550–600 |
| Co(II) Containing Silica-X Aerogel | ~0.26 | 1.14 | 500–800 |
| Rh(III) Containing Silica-X Aerogel | ~0.27 | 1.17 | 550–950 |
| Ru(III) Containing Silica-X Aerogel | ~0.27 | 1.17 | 500–800 |

*Refractive indices are measured at 632.8 nm with Metricon (Model 2010) Prism Coupler The aerogels prepared by the methods of this invention are useful for absorbing and extracting metal ion containing species from solutions.

The examples showing the uptake of metal ions in the function of the sol-gels, followed by super critical extraction, and then their conversion to dense glassy materials at 800° C., shows that the methods provide an improved way to encapsulate metal ions such as those from nuclear waste. The high temperature step of this process involves the loss of a very small mass of volatiles relative to the mass of the metals taken up in comparison to conventional sol-gel processes. It involves low temperature glass formation to obtain silica composites relative to conventional melt-quench methods.

The invention has been described with reference to the preferred embodiments. Obviously, modifications and alterations will occur to others upon a reading and understanding the preceding detailed description. It is intended that the invention be construed as including all such modifications and alterations in so far as they come within the scope of the appended claims or the equivalents thereof.

We claim:

1. A medium for printing comprising an aerogel comprising silica, at least one organic polymer with a polar functional group, and at least one metal-ion-containing species, wherein the polar functional group of the organic polymer is selected from the group consisting of amine, carbonyl, acylamine, protonated amine, hydroxyl, and carboxyl groups.

2. The medium for printing of claim 1 wherein the polymer is selected from the group consisting of a chitosan with a deacylation degree 50 to 100%, pectic acid, and alginic acid.

3. The medium for printing of claim 1 wherein the metal is selected from the group consisting of Co, Cu, Fe, Cr, Ni, Mn, Rh, Ru, Ir, Pd, Pt, Yb, Er, Eu, Sm, and Dy.

4. The medium for printing of claim 1 wherein the metal is a metal ion having an oxidation state from one to six.

5. The medium for printing of claim 1 wherein the metal is a metal ion having an oxidation state from one to three.

6. The medium for printing of claim 1 wherein the metal-ion-containing species have oxidation states from zero to six.

7. The medium for printing of claim 1 in the form of a monolithic product which has at least 50% light transmission when a 0.3 mm thick sample of the material is measured at a wavelength between about 2600 and about 300 nanometers.

8. A composition adapted for use as a coating for paper, the composition comprising:

silica; and chitosan, the composition further comprising a metal-ion containing species.

9. A composition adapted for use as a coating for paper, the composition comprising an aerogel comprising:

silica; and chitosan, wherein the chitosan has an average molecular weight of from about 35,000 to about 3,000,000.

10. The composition of claim 9 wherein the chitosan has an average molecular weight of from about 150,000 to about 2,500,000.

11. The composition of claim 10 wherein the chitosan has an average molecular weight of from about 300,000 to about 2,100,000.

* * * * *